United States Patent [19]

Marcel et al.

[11] Patent Number: 5,317,571
[45] Date of Patent: May 31, 1994

[54] METHOD FOR DETERMINING THE TRANSMISSION TIME BETWEEN REMOTE AND CENTRAL TERMINAL STATIONS IN A POINT-TO-MULTIPOINT BIDIRECTIONAL TRANSMISSION NETWORK

[75] Inventors: Francois Marcel, Orsay, France; Dany Sallaerts, Anvers, Belgium; Serge Allaire, Beaumont Le Roger; Pierre Dore, Levallois-Perret, both of France

[73] Assignee: Alcatel Cit, Paris, France

[21] Appl. No.: 11,147

[22] Filed: Jan. 29, 1993

[30] Foreign Application Priority Data

Jan. 31, 1992 [EP] European Pat. Off. ........ 92400266.0

[51] Int. Cl.[5] .............................................. H04J 3/06
[52] U.S. Cl. .................................... 370/103; 375/109
[58] Field of Search .................. 370/13, 13.1, 14, 17, 370/104.1, 108, 85.2, 103; 340/825.5; 375/109

[56] References Cited

U.S. PATENT DOCUMENTS

| | | | |
|---|---|---|---|
| 4,472,802 | 9/1984 | Pin et al. | 370/108 |
| 4,569,042 | 2/1986 | Larson | 370/13 |
| 4,694,453 | 9/1987 | Kobayashi et al. | 370/14 |
| 4,800,560 | 1/1989 | Aoki et al. | 370/108 |
| 4,811,338 | 3/1989 | Maruyama et al. | 370/85.2 |
| 5,048,009 | 9/1991 | Conrad | 370/85.1 |
| 5,049,982 | 8/1991 | Werner | 370/108 |

FOREIGN PATENT DOCUMENTS

| | | |
|---|---|---|
| 0188117 | 7/1986 | European Pat. Off. . |
| 0208021 | 1/1987 | European Pat. Off. . |
| 2636482 | 3/1990 | France . |
| 2095516 | 9/1982 | United Kingdom . |

Primary Examiner—Douglas W. Olms
Assistant Examiner—Ajit Patel
Attorney, Agent, or Firm—Sughrue, Mion, Zinn, Macpeak & Seas

[57] ABSTRACT

A method for determining the transmission time between remote terminal stations and a central terminal station in a point-to-multipoint bidirectional transmission network. The central station measures the time interval between a reference time for sending of information signals by the central station and reception by the central station of a location signal sent by a remote station after a time-delay starting from a reference time for reception of information signals by the remote station so that the location signal is received by the central station in a predetermined location window not assigned to reception of information signals by the central station. For a given remote station the time-delay is variable from an initial value such that the location signal is not necessarily received in the window and the location signal sending by the remote station is then repeated until the location signal is received by the central station in the window.

11 Claims, 4 Drawing Sheets

METHOD FOR DETERMINING THE TRANSMISSION TIME BETWEEN REMOTE AND CENTRAL TERMINAL STATIONS IN A POINT-TO-MULTIPOINT BIDIRECTIONAL TRANSMISSION NETWORK

BACKGROUND OF THE INVENTION

1. Field of the invention

The present invention concerns point-to-multipoint transmission networks linking a central station and a plurality of remote stations.

The present invention is more particularly concerned with networks of this kind which comprise between said central station and a concentration point a transmission medium which is time-shared between the various remote stations and between said concentration point and each remote station a respective transmission medium specific to each remote station and the lengths of which vary according to the location of the remote stations relative to the concentration point.

The present invention is applicable in particular to distribution networks used in the terminal part (close to the users) of a telecommunication network and particularly to distribution networks of this kind in which said transmission media are optical fibers and said concentration point is a passive optical coupler.

The present invention is more specifically concerned with the situation in which said time-sharing of the transmission medium utilizes the TDMA (Time Division Multiple Access) technique with a transmission format structured in frames comprising different time slots assigned in a predetermined manner to respective different remote stations.

For transmission in an "upward" direction from the remote stations to the central station the problem arises of identifying the time for transmission by each of the various remote stations so that when the information transmitted reaches the shared transmission medium it is in the respective time slots assigned to the various remote stations.

2. Description of the prior art

A known way to solve this problem is to implement at each remote station a specific transmission time-delay in order to compensate for the different transmission times to the central station from the remote station in question and a reference remote station.

The transmission time between a remote station and the central station is usually determined by measuring at the central station the time which elapses between a reference time at which information signals are sent by said central station and the time at which said central station receives a location signal transmitted by said remote station with a time-delay relative to a reference time at which said remote station receives said information signals determined in such a way that the various location signals sent by the various remote stations are received in a given period known as the location window which is not assigned to receiving information signals.

This transmission time measurement technique is described in French patent application N° 2 636 482, for example.

It has the drawback that it requires a relatively wide location window covering all location. signal intermediate positions between respective extreme positions representing the remote station nearest the central station and the remote station farthest from the central station.

SUMMARY OF THE INVENTION

An object of the present invention is a method for determining the transmission time between remote and central stations in a point-to-multipoint bidirectional transmission network in which said location window can be very much narrower than indicated above.

The present invention is equally applicable whether the same medium is used to transmit in both directions (half-duplex transmission) or two separate media are used for transmission in opposite directions.

The present invention consists in a method for determining the transmission time between remote terminal stations and a central terminal station in a point-to-multipoint bidirectional transmission network, said method comprising measurement by the central station of the time interval between a reference time for sending of information signals by said central station and reception by said central station of a location signal sent by a remote station after a time-delay starting from a reference time for reception of said information signals by said remote station so that said location signal is received by said central station in a predetermined location window not assigned to reception by said central station of information signals, in which method for a given remote station said time-delay is variable from an initial value such that the location signal is not necessarily received in said window and said location signal sending by the remote station is then repeated until said location signal is received by said central station in said window.

Other objects and features of the present invention will emerge from the following description of embodiments thereof with reference to the appended drawings.

DETAILED DESCRIPTION OF THE INVENTION

In these examples the location window is relatively narrow and in all cases narrower than would be required in the prior art solution mentioned above; this window will be referred to as a reduced width window.

Figure 1:
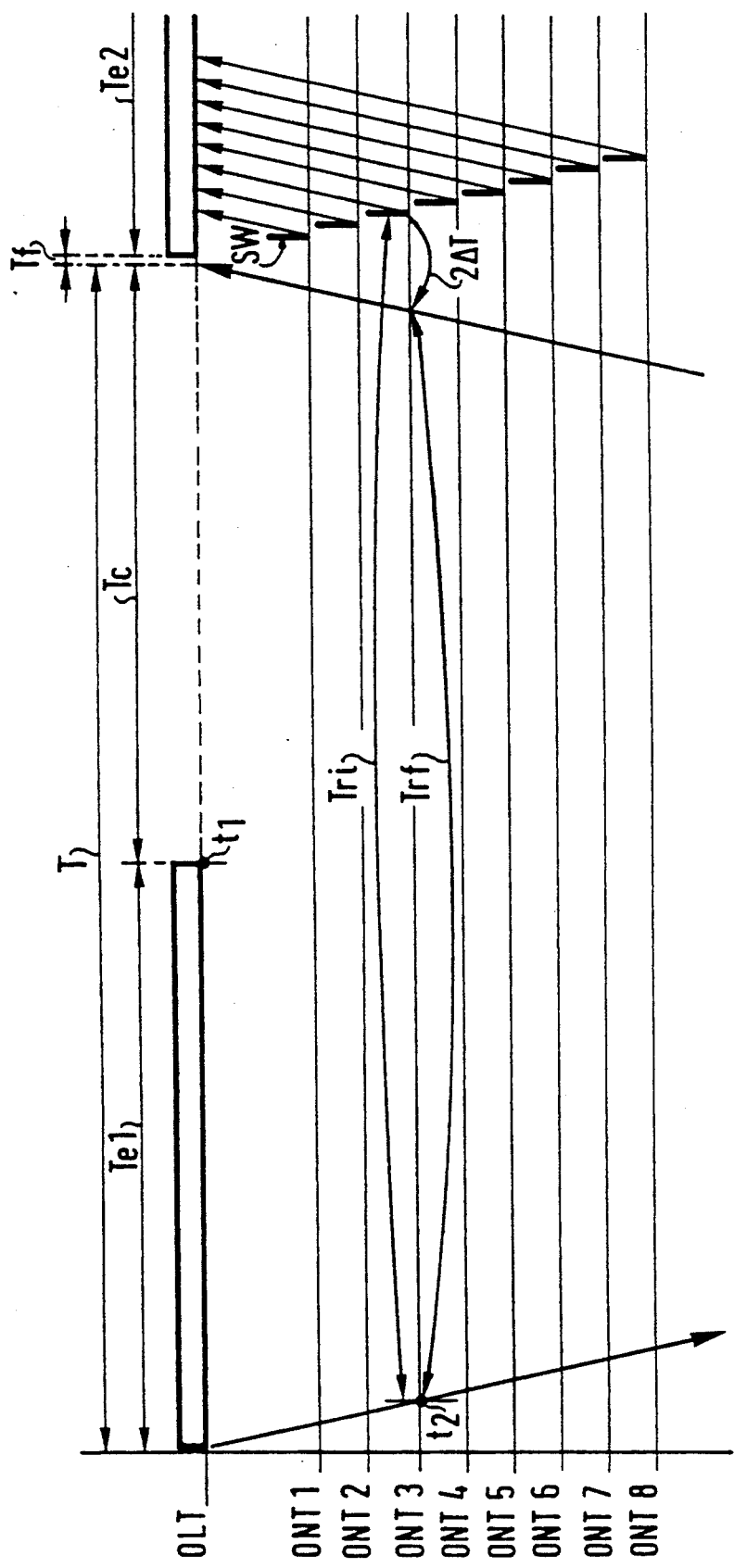
FIG. 1 is a diagram showing a method in accordance with the invention in the case of a halfduplex bidirectional transmission system using the same medium for both transmission directions.

Let T denote the transmission period of the central station. Referring to FIG. 1, this transmission period includes a period assigned to sending and a period assigned to receiving. In the first line of the FIG. 1 diagram Te is the period for sending in the downward direction from the central station OLT to a plurality of "n" remote stations ONT1, ONT2, ONT8 (in this example n=8). FIG. 1 therefore shows two consecutive send periods Te1 and Te2.

In the embodiments described the transmission format in the "downward" direction comprises at least one time slot reserved for transmission of specific information signals addressed to all of the remote stations (these signals are referred to collectively as "signalling").

In these examples this signalling includes a signal for addressing one of the "n" remote stations in order to trigger sending by this remote station of a location signal SW. Unlike other signalling to be described hereinafter, the sending of these addressing signals is not subject to any condition; it is therefore systematic and cyclic, the "n" remote stations being addressed in turn, for example.

The time as measured by the central station at which a location signal is received relative to a reference time at which said central station sends indicates the transmission time between said remote station and the central station. This reference time $t_1$ is the end of the send period Te1, for example.

The location signal is sent by the remote station addressed in this way after a time-delay starting from a reference time for reception by said remote station. This reference time $t_2$ is the start of the period of reception by the remote station, for example, as shown in the fourth line of the diagram for station ONT3, for example.

This time-delay is variable from an initial value such that the respective location signal is not necessarily received in the reduced width location window Tf provided at the central station in the time period T - Te.

In the embodiments described the signalling further comprises a signal indicating non-reception of the location signal in the location window.

If the location signal is not received in this window, as indicated by this signal for indicating nonreception of the location signal in the location window, the next sending of the location signal by the remote station in question (triggered, as mentioned above, by an addressing signal) is effected with a different timedelay such that the location signal falls in said reduced width location window or at least moves closer to it. This time-delay is obtained by automatically incrementing the previous time-delay by a predetermined value equal to the time-delay variation increment, for example.

If the location signal is not received in the reduced width location window for the initial value of this time-delay, the period in which the location signal is received for this initial value and for any intermediate values between the initial value and the final value of the time-delay for which the location signal is received in this window is advantageously a time period not assigned to reception of information signals by the central station. This is to avoid any possibility of collision between information and location signals received by the central station and is valid regardless of the bidirectional transmission system used (using two separate media or half-duplex transmission on a single medium).

In the case of half-duplex bidirectional transmission on a shared medium for both transmission directions this period is advantageously a period assigned to sending by the central station. Problems related to collisions between information signals sent by the central station and location signals sent by a remote station can be solved by using in the central station send-receive coupling means such that the level of the location signals received by this station has no effect on the information signals sent by this station.

As shown in FIG. 1, this period assigned to sending by the central station is advantageously the period Te2 following that Te1 including the reference time $t_1$, the reduced width location window in this case immediately preceding the period Te2.

As shown in FIG. 1, the initial time-delay Tri is then advantageously equal to the duration T of the transmission period. In this case, regardless of the remote station concerned, the location signal is not received in the location window for this initial value and the time-delay is then varied, as shown in FIG. 1, by decreasing it from this initial value to a final value Trf.

It would be equally feasible to choose an initial time-delay value less than T in which case the time-delay would be varied by increasing it from this initial value.

It would also be feasible to use the period Te1 containing the reference time $t_1$ in question as the period assigned to sending and in which the location signal would fall for the initial and intermediate values of the time-delay, the reduced width location window immediately following this period Te1, for example.

In the case of half-duplex bidirectional transmission on a shared medium the time-delay variation increment is advantageously equal to the width of the reduced width location window.

Figure 2:
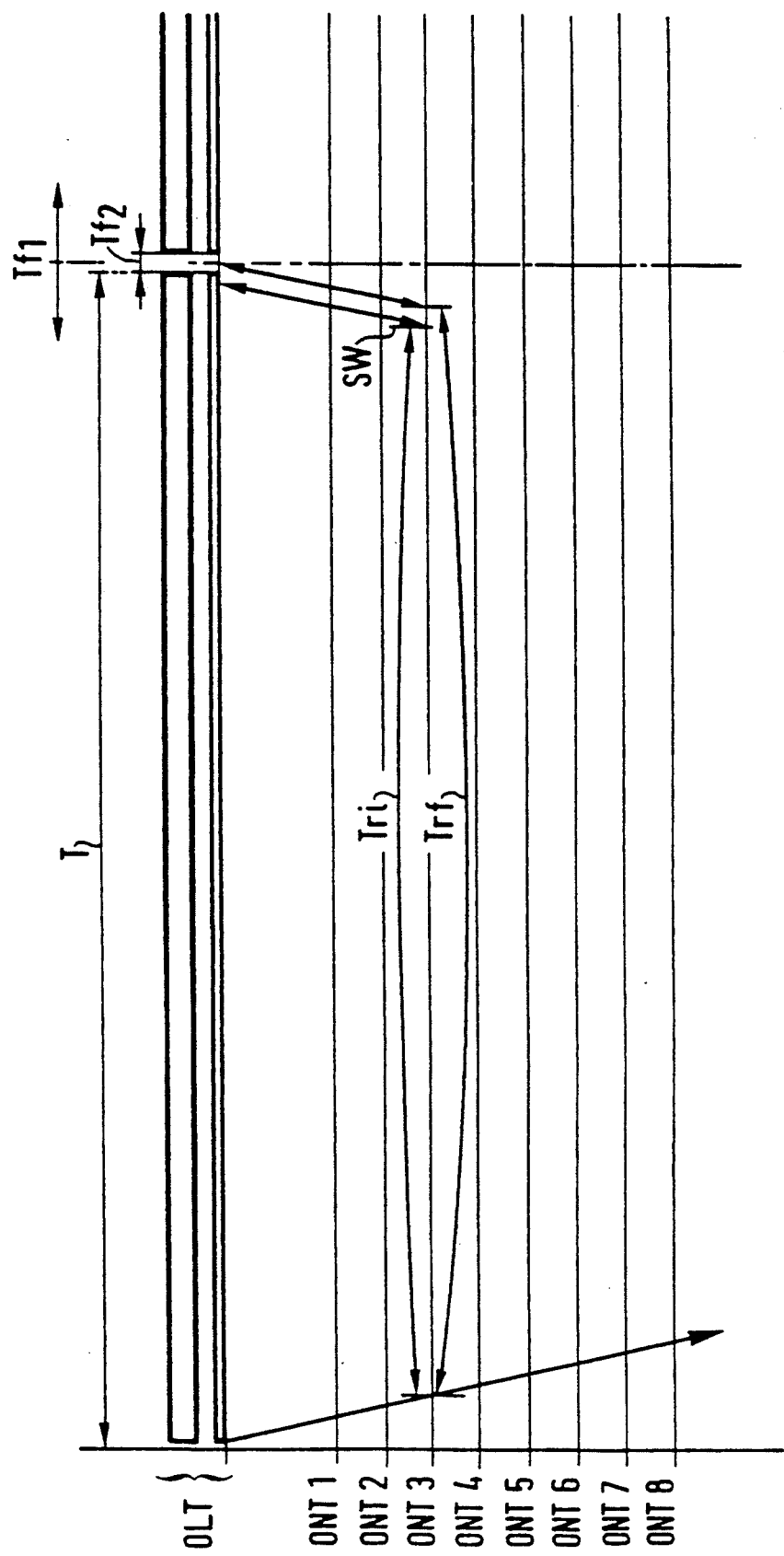
FIG. 2 is a diagram showing a method in accordance with the invention in the case of a bidirectional transmission system using two separate media for the opposite transmission directions.

Referring to FIG. 2, in the case of bidirectional transmission using two separate media the periods Te and Tr for sending and receiving by the central station respectively shown on the first and second lines of the FIG. 1 diagram can occupy the total duration of the transmission period T excluding the width of the reduced width location window.

To reduce the time to determine the final value of the time-delay for which the location signal falls in the location window, the width of the latter is advantageously variable and in this instance has a first width Tf1 in a first period and a narrower second width Tf2 in a second period. The time-delay variation increment has in a first period a first value advantageously equal to said first width and in a second period a second value less than the first and advantageously equal to said second width. For each of these periods the process is similar to that described previously for a single period and the changeover from the first period to the second occurs when the location signal is received in the location window whose width is said first width.

In all the examples considered the fact that the central station detects the location signal in the reduced width window (or in the narrower of the two reduced width windows in the last example referred to) is indicated to the remote station in question when it is next addressed by means of a specific signal indicating detection of the location signal in the location window. This remote station then sends the final time-delay value Trf to the central station which can then calculate the required transmission time $\Delta T$ using the following equation allowing for the reference times chosen:

$$2\Delta T = Te + Tc - Trf$$

in which Tc is the duration obtained after the counting carried out as described above in the central station and Te is the period for sending by the central station. Note that regardless of the reference times chosen, the calculation of the transmission time in accordance with the invention requires:

measurement by the central station of the time interval between the reference time for sending of information signals by the central station and the time at which the central station receives a location signal sent by a remote station after a time-delay starting from the reference time for reception of said information signals by this remote station, this time-delay being determined so that the location signal is received in the location window concerned, and determination by said remote station of the final time-delay value Trf for which the location signal is received in this window.

If the transmission time is calculated in the central station the value Trf is transmitted by the remote station to the central station. The final time-delay value Trf may be transmitted by means of a specific information signal which is part of the signalling transmitted in the upward direction, for example.

In all the examples the level of said location signal is advantageously varied from an extreme (minimal or maximal) value to an intermediate value which varies depending on the remote station in question and produces substantially the same level at the central station for all the remote stations.

The direction of the variation to be applied for this purpose to the level at which the remote station sends the location signal is determined at the central station, for example, and transmitted to the remote station by a level variation control signal.

The level at which the location signal is sent may be controlled by any conventional means (not described here).

Note that the receiver at the central station may advantageously be chosen to have the greatest possible receive dynamic range so that it is able to receive any level sent by a remote station at any distance from the central station.

This requirement as to the quality of this receiver may be less constraining if the send level is varied by increasing it from a minimal value rather than reducing it from a maximal value.

Note further that the detection threshold of the receiver is advantageously relatively low to detect a location signal, in order to increase the probability of detecting any such signal, and relatively high to detect information signals, in order to optimize the conditions for reception of such information signals.

Note further that if the send level is varied by reducing it from a maximal value such variation may be applied once the location signal has been detected in the reduced width location window (or in the narrower of the two reduced width windows in the last example referred to above).

Note also that if the send level is varied by increasing it from a minimal value, depending on said minimal value, it may be necessary to vary the level not only to obtain substantially the same level at the central station for all the remote stations, as mentioned above, but also in order to be able to detect the location signal at the central station in the reduced width location window (or in the narrower of the two reduced width windows in the last example referred to above). Two conditions must then be met if a location signal is to be detectable in the location window concerned. One is that it is sent with an appropriate time-delay, as described above, and the other is that it is of sufficient level. For example, if the signal indicating non-reception of the location signal in the location window indicates that the signal has not been detected for a given time-delay value and a given level, all or part of the level variation range is systematically scanned (for example by systematically incrementing the previous level by a predetermined amount equal to the level variation increment) before moving on to the next time-delay value, if necessary.

One advantageous application of the present invention is to the situation in which, in addition to reducing the width of the location window, there is the parallel requirement to reduce the width of the time slots provided in the transmission format employed to allow for the transmission times and that cannot be used to transmit information. This will now be explained with reference to FIGS. 3, 4 and 5.

Figure 3:
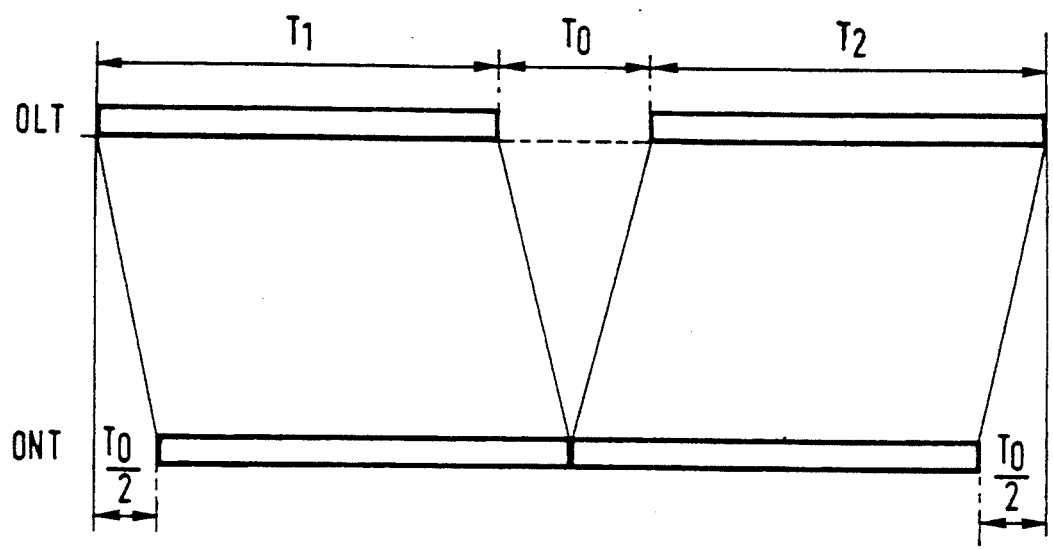
FIGS. 3, 4 and 5 show one example of application of the present invention consisting in the conjoint use of this method and a particular method of allocating time slots for transmission in a point-to-multipoint TDMA half-duplex bidirectional transmission network, this method being shown in FIG. 5 and producing a specific transmission format shown in FIG. 4 differing from the transmission format conventionally obtained in a network of this kind as shown in FIG. 3.

In FIG. 3, $T_1$ is the duration of a downward frame sent by the central station (OLT) and received by a remote station (ONT). $T_2$ is the duration of an upward frame sent by a remote station and received by the central station. $T_1=T_2$, for example. $T_0$ is the duration of a period that cannot be used to transmit information, as explained above.

Figure 4:
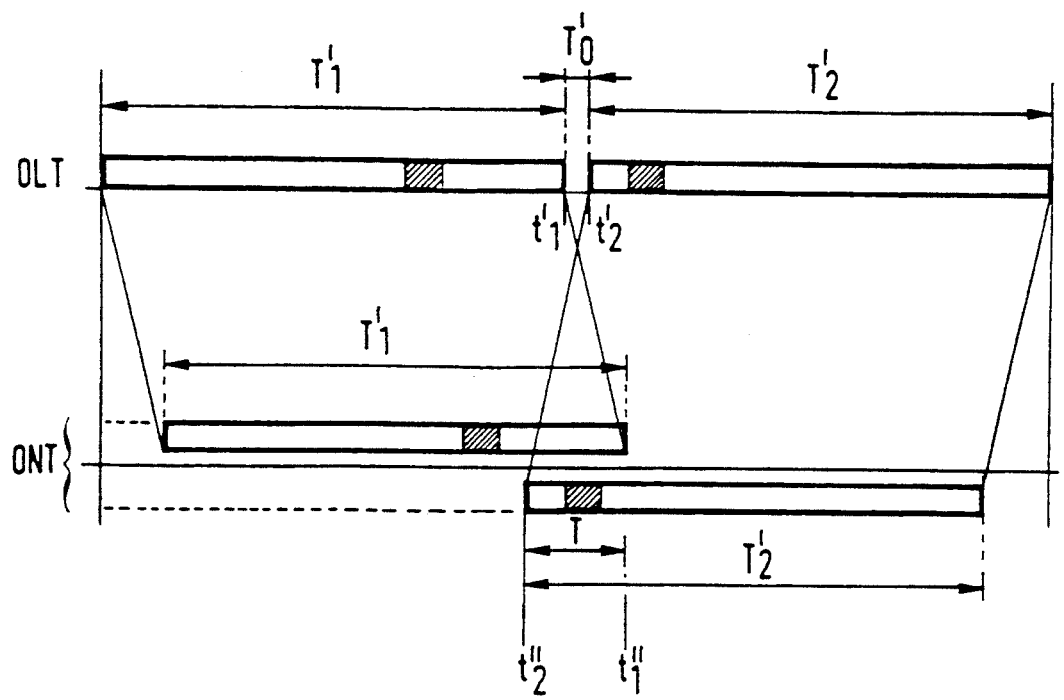

In FIG. 4, $T'_1$ the duration of the downward frame and $T'_1>T_1$. $T'_2$ is the duration of the upward frame and $T'_2>T_2$. $T'_1=T'_2$, for example. $T'_0$ is the duration of a period that cannot be used to transmit information and $T'_0<T_0$. In this example the duration $T'_0$ a finite value but the method of the invention does not exclude a zero value for $T'_0$.

A method of allocating time slots will now be described with reference to FIG. 5 and produces a transmission format of the type shown in FIG. 4. It is based on the observation that, as the transmission system is of the time division multiple access type, as mentioned above, a remote station can be authorized to send while it is receiving information addressed to another remote station.

This assumes that the directivity of the coupler used at said concentration point in the point-to-multipoint system considered is sufficiently high for signals reflected towards the other remote stations following any such sending by a remote station to be regarded as negligible.

It also assumes that the clock recovery means in the receive part of a remote station are capable of continuing to provide said clock when reception is interrupted to carry out this sending.

In the example under discussion the duration $T_0-T'_0$ usable for transmission of information by the allocation method now to be described. It is shared equally between the downward and upward frames.

As mentioned above, this method applies to TDMA (Time Division Multiple Access) transmission, i.e. a transmission format structured in upward or downward frames comprising various time slots assigned in a predetermined manner to respective remote stations.

As shown schematically in FIG. 4, this method of allocating time slots allocates for transmission between the central station and a remote station at least one time slot in the downward frame and at least one time slot in the upward frame, the number of time slots to be allocated depending on the volume of information to be transmitted between the stations and, in the case of a plurality of time slots, each being allocated autonomously, by the method in accordance with the invention, so that the various time slots are not necessarily consecutive.

In the following description the various time slots are denoted by numbers using a numbering scheme in which:

in the central station numbers are assigned continuously in increasing order from an origin at the start of the downward frame and are common to the downward frame and to the upward frame (allowing for the period $T'_0$ when this is non-zero, of course), in a remote station:

for the downward frame numbers are assigned continuously in increasing order from an absolute origin at the start of the downward frame, for the upward frame there is a change of origin and numbers are assigned continuously in increasing order from a relative origin within the downward frame.

The origin time $t''_2$ of the upward frame in a remote station is determined such that the origin time $t'_2$ of this frame in the central station (i.e. allowing for the transmission time between the two stations) coincides with the start of the period $T'_2$. As shown in FIG. 4, this results in some overlap between downward and upward frames in the remote station. Let ID denote the number of the time slot in the downward frame which coincides with the first time slot of the upward frame. In the following description the overlap area T in FIG. 4 is the set of time slots of the downward frame having a number between ID and IU inclusive where IU is the number of the last time slot of the downward frame.

Note that the number ID varies for each remote station according to the transmission time between the remote station and the central station.

Determining ID entails measuring the transmission time T between the remote and central stations and this can be done by a conventional method (not described here). The parameters $t''_2$, $t'_2$ and $\Delta T$ are related by the equation:

$$t''_2 + \Delta T = t'_2$$

Knowing $\Delta T$ and $t'_2$ for a given remote station it is therefore possible to determine $t'_2$ and therefore ID for that remote station.

In other words, the origin time $t''_2$ of the upward frames in a remote station is before the end time $t''_1$ of the downward frames in the same remote station and is separated from it by the period needed to obtain the required transmission format at the central station, in other words to enable reduction or even elimination of periods that cannot be used for transmission of information.

Let Id and Iu respectively denote a time slot number in the downward frame and a time slot number in the upward frame to be allocated for transmission between the central station and a given remote station using the numbering scheme described above for the remote stations.

In this example it is assumed that the method of allocating time slots is implemented at the central station and the first step is to assign a time slot number Id in the downward frame.

The only conditions that apply to the number Id are then that it is the number of a free (i.e. as yet unallocated) time slot and that its value is less than IU. Any number meeting these conditions may be used for the number Id.

Figure 5:
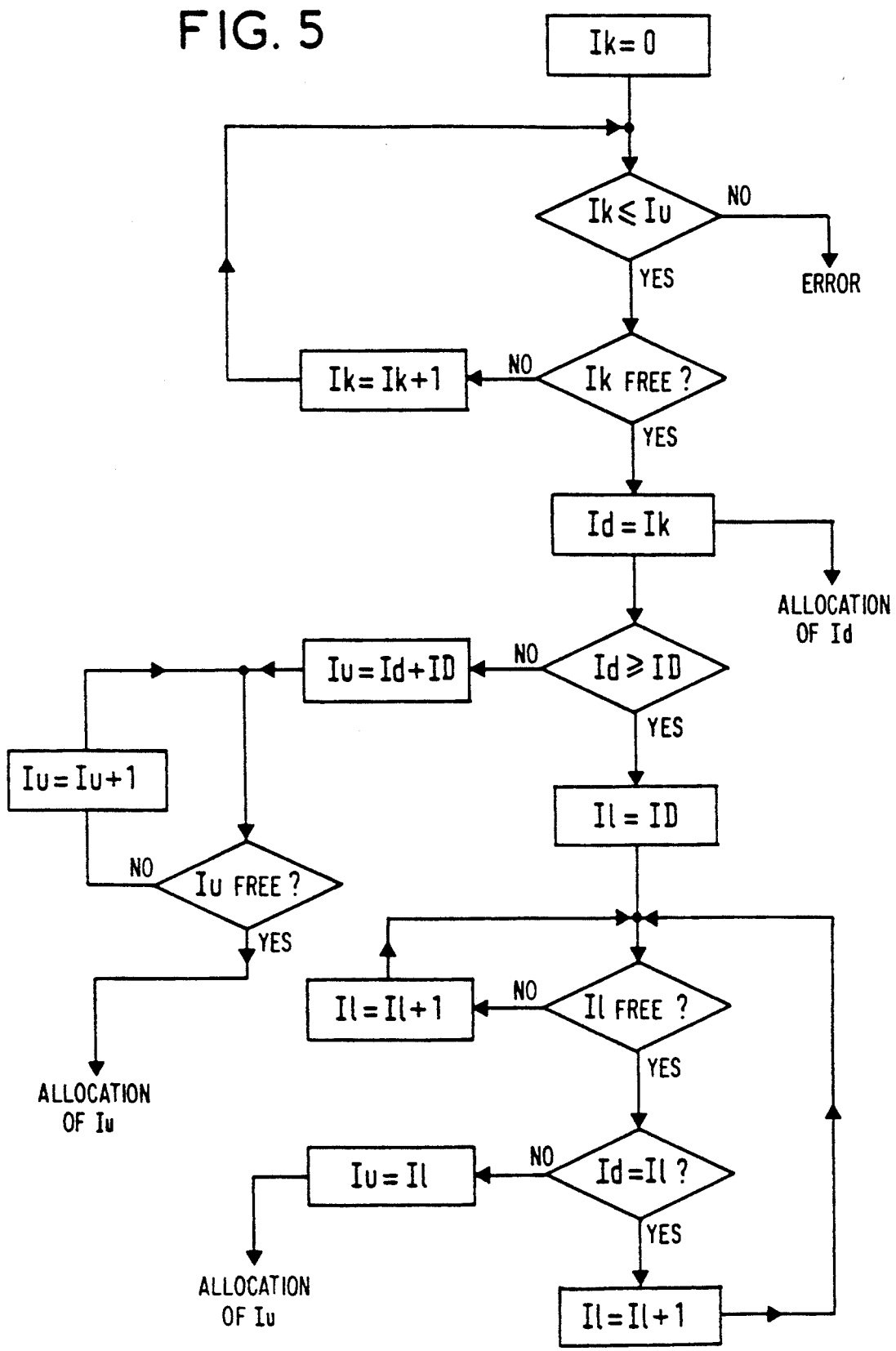

As shown in the FIG. 5 flowchart, for example, the number Id could be determined by successively considering the various time slots of the downward frame starting from the first, i.e. from that numbered zero in the FIG. 5 flowchart, and checking each time if it is available; if it is not available, the next is considered and if this is available its number can be used as the required number Id.

The process shown in the FIG. 5 flowchart utilizes an intermediate variable Ik which is incremented by unity each time an unavailable time slot is detected. Also as shown in the FIG. 5 flowchart, the detection of a number Ik greater than IU generates an error message.

A time slot number Iu in the upward frame is allocated as follows. The first step is to determine if the time slot corresponding to the number Id allocated in this way is in the overlap area or not by comparing the number Id with the previously defined number ID.

If it is not, the number Iu is advantageously determined in such a way as to retain symmetry of allocation of time slots in the downward and upward frames. Given the numbering scheme adopted for the remote stations, this is represented by the equation:

$$Iu = ID + Id$$

This number Iu can be retained as the required number Iu only if it is the number of a free time slot, however. If not, this number is incremented by unity, for example, and the availability test is repeated. This process is continued until a free time slot number Iu is obtained, as shown in the FIG. 5 flowchart.

If the time slot corresponding to the number Id thus allocated is in the overlap area it is necessary to check that a choice of the time slot Iu does not cause any send/receive collision and, given the numbering scheme adopted for the remote stations, this means that the numbers Iu and Id must be different.

The number Iu is determined, for example, by considering in succession the various time slots of the upward frame starting with the first, in other words, given the numbering scheme adopted for the remote stations, from that whose number is ID. Each time whether the time slot is available is determined and if it is not available the next is considered and if this is available it is checked to ensure that it is not identical to the previously assigned number Id. If the numbers are identical a subsequent time slot is considered but if they are not identical the number of this time slot may be retained as the required number Iu.

As shown in the FIG. 5 flowchart, this method utilizes an intermediate variable Il which is incremented by unity each time that an unavailable time slot is detected.

The method of allocating time slots described above can be implemented in the central station or in the remote stations but if it is implemented in the remote stations it is necessary to centralize the results at the central station and the central and remote stations must communicate to implement the method.

There is claimed:

1. A method for determining the transmission time between remote terminal stations and a central terminal station in a point-to-multipoint bidirectional transmission network, said method comprising the steps of: measuring by the central station of a time interval between a first reference time for sending of information signals by said central station and reception by said central station of a location signal sent by a remote station after a time-delay starting from a second reference time for reception of said information signals by said remote station so that said location signal is received by said central station in a predetermined location window which has a width and which is not assigned to reception by said central station of information signals; for a given remote station, varying said time delay from an initial value such that the location signal is not necessarily received in said window; and then, when the location signal is not received in said window, repeating said location signal sent by the remote station until said location signal is received by said central station in said window.

2. The method according to claim 1, wherein the width of said location window is less than that which would be required to accommodate all intermediate location signal positions between extreme positions respectively representing (1) the remote station nearest the central station and (2) the remote station farthest from the central station.

3. The method according to claim 1, wherein, in the case of half-duplex bidirectional transmission on a shared transmission medium, the period in which said location signal is received for said initial value and for any intermediate values, between said initial value a final value for which said location signal is received in said window, is a period assigned to the sending of information signals by said central station.

4. The method according to claim 1, wherein the time-delay is varied in increments equal to the width of said window.

5. The method according to claim 1 wherein, in the case of bidirectional transmission on two separate media, the width of said window is variable and has a first width in a first period and a second width less than the first in a second period after reception of the location signal in the location window having said first width.

6. The method according to claim 5, wherein the time-delay is varied in increments equal to said first width in said first period and equal to said second width in said second period.

7. The method according to claim 1, wherein said location signal has a level which varies from an extreme value to a value such that said central station receives substantially the same level from all the remote stations.

8. The method according to claim 7, wherein the direction of variation of the location signal level by a remote station to achieve a required level is determined at said central station and then transmitted to the remote station concerned by a level variation control signal.

9. The method according to claim 1, wherein the timedelay variation is controlled by a signal sent by the central station indicating non-reception of the location signal in the location window.

10. The method according to claim 7, wherein, if said location signal level is varied from a minimal value, it is further varied in order to obtain a level sufficient to enable it to be detected by the central station.

11. The method according to claim 10, wherein the level variation to achieve a sufficient level to enable it to be detected by said central station is also commanded by a signal indicating non-reception of said location signal in said location window.

* * * * *